United States Patent Office 3,214,714
Patented Oct. 26, 1965

3,214,714
ELECTRO-MECHANICAL TRANSDUCERS
George Raoul Pontzen, Little Chalfont, England, assignor to Lustraphone Limited, London, England, a British company
Filed Aug. 27, 1962, Ser. No. 219,595
Claims priority, application Great Britain, Aug. 31, 1961, 31,438/61
7 Claims. (Cl. 336—30)

This invention relates to electro-mechanical transducers.

According to the present invention there is provided an electro-mechanical transducer comprising means for creating a magnetic field across an air gap, a supporting member carrying a coil which is disposed within said air gap, both sides of said member being substantially freely accessible to the surrounding air, and a button carried by said member for picking up the mechanical vibrations of a body for physical contact with the body, the arrangement being such that vibrations picked up by the button cause the button, the member and the coil to vibrate so that an electromotive force is generated in the coil.

For a better understanding of the invention and to show how the same may be carried into effect reference will now be made, by way of example, to the accompanying drawing, in which.

Figure 1:
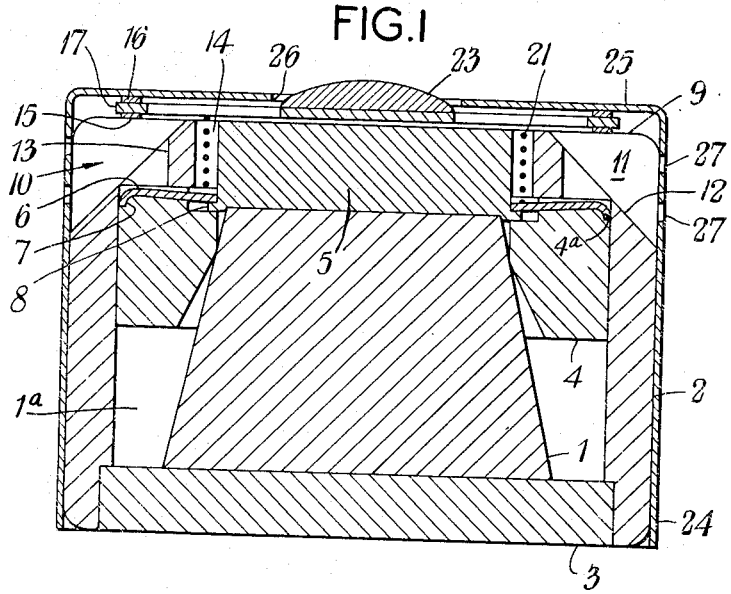
FIGURE 1 is a cross-sectional view of an electro-mechanical transducer.

The electro-mechanical transducer shown in the drawing includes a pot-type magnet comprising a permanent magnet 1 disposed co-axially within a cylindrical magnet body 2. One end of the body 2 is closed by a tightly fitting back plate 3. The magnet 1 is of frustoconical form and the larger diameter end thereof seats on the interior surface of the back plate 3. The maximum diameter of the magnet 1 is less than the interior diameter of the body 2. A ring 4 surrounds the smaller diameter end of the magnet 1 and seals the gap or space 1a between the magnet 1 and the body 2. A disc-like pole piece 5 seats on the smaller diameter end of the magnet 1 and is held in a position in which it is co-axial with the magnet body 2 by a centering washer 6 of annular form. The outer periphery of the washer 6 is turned over to form a cylindrical rim 7 and this rim 7 is entered in an annular groove 4a provided in that surface of the ring 4 which is remote from the base plate 3. The pole piece 5 has a circumferentially extending rib 8 at the end thereof adjacent the magnet 1 and the inner periphery of the washer 6 seats on that annular surface of the rib 8 which is remote from the magnet 1.

The magnet body 2 extends beyond the sealing ring 4 and around the pole piece 5. The part of the magnet body 2 which is around the pole piece 5 has a radially inwardly extending flange 9. The exterior, annular surface of the flange 9 lies in the plane of that surface of the pole piece 5 which is remote from the magnet 1. The washer 6 is disposed between the sealing ring 4 and the flange 9. A plurality of recesses 10 are formed in the flange 9 and in the adjacent part of the body 2 whereby a castellated form is imparted to the end of the magnet body 2. Each recess 10 has two side surfaces 11, and a bottom surface 12 which is inclined with respect to the axis of the body 2. The direction of inclination of the bottom surface 12 is such that the recess 10 becomes shallower, measured from the exterior surface of the flange 9, from the radially outer periphery of the flange 9 towards the radially inner periphery thereof.

The maximum width of the recess 10, measured radially, is less than the radial width of the flange 9 whereby an uninterrupted ring 13 is formed at the inner circumference of the flange 9. The radially inner surface of the ring 13 is co-axial with the cylindrical surface of the pole piece 5 and these surfaces constitute the faces of an annular air gap 14.

Figure 2:
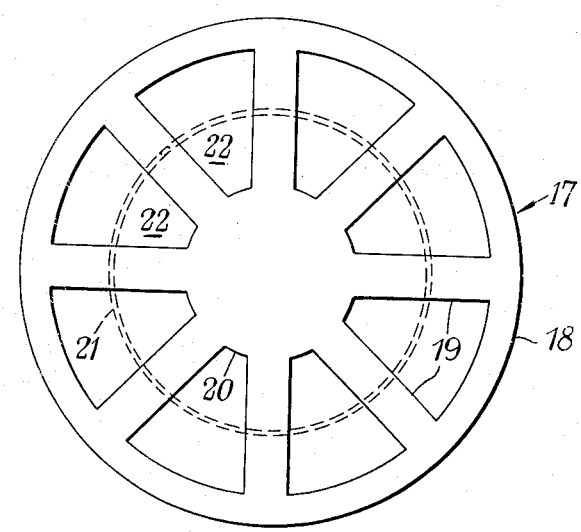
FIGURE 2 is an underneath plan view of a detail of the transducer of FIGURE 1.

A clamping ring 15 is secured to the flange 9 on the side thereof which is remote from the sealing ring 4. Between this clamping ring 15 and a co-operating clamping ring 16 there is secured a phosphor-bronze supporting member in the form of a spider 17 (see FIG. 2). The spider 17 comprises an annular peripheral portion 18 which is clamped between the rings 15 and 16 co-axially with the body 2, and spokes 19 which extend radially inwardly from the portion 18 and terminate in a disc-like central portion 20. The spokes 19 have the smallest area which is consistent with the central portion 20 of the spider 17 being sufficiently well supported. A coil 21 of cylindrical form is secured to the spokes 19 of the spider 17 on one side of the spider 17 and is entered in the air gap 14. The apertures between successive spokes 19 of the spider 17 extend both radially inwardly and radially outwardly from the coil 21. It will be understood that the spider 17 has apertures 22 therein within the area thereof enclosed by the coil. On that side of the disc-like central portion 20 of the spider 17 which is remote from the pole piece 5 there is secured an "elastic" button 23 for picking-up mechanical vibrations by physical contact with a vibrating body (not shown). For example, the vibrations may be those of the human heart, the transducer in this case being part of an electronic stethoscope.

The arrangement hereinbefore described is contained within a casing 24 of cylindrical form. At that end of the casing 24 which is adjacent the button 23, the casing 24 has a disc-like end 25 which encloses the greater part of the spider 17. The end 25, however, has a centrally disposed aperture 26 through which the button 23 freely projects whereby physical contact with a vibrating body can be made. The casing 24 has apertures 27 in the cylindrical side walls thereof, these apertures 27 opening into the castellations or recesses 10 of the flange 9 at the end of the body 2.

The positioning of the spider 17 is such that part of the length of each of the spokes 19 of the spider 17 overlies one of the recesses 10 in the magnet body 2 whereby the apertures 27 in the casing 24 each lead directly to one of the recesses 10 which are formed behind the spokes 19. Hence both sides of the spider 17 are substantially freely accessible to the surrounding air.

The magnet circuit of the transducer consists of the magnet 1, the back plate 3, the magnet body 2, the flange 9, and thence across the air gap 14 to the pole piece 5. Movement of the coil 21 under the influence of vibrations picked up by the button 23 and transmitted to the coil 21 by the spider 17, generate electromotive forces in the coil 21.

Sound waves impinge substantially simultaneously on both sides of the spider 17 by virtue of the apertures 27 in the casing 24, but the sound waves do not have any substantial effect on the coil 21, and hence cause substantially no output signal. This results in a noise cancelling effect.

I claim:

1. An electro-mechanical transducer comprising
    (a) pole pieces defining an air gap,
    (b) means supporting said pole pieces for creating a magnetic field across said air gap including a magnet,
    (c) a supporting member both sides of which are substantially freely accessible to the surrounding air, the supporting member including spokes, (d) means carried by the magnet for supporting said supporting member, (e) a coil secured to said spokes intermediate the ends of the spokes and disposed within the air gap, and (f) a button carried by said supporting member for picking up mechanical vibrations of a body by physical contact with the body.

2. A transducer according to claim 1, wherein said member comprises an annular peripheral portion and a disc-like central portion carrying said button, and wherein said spokes extend from said peripheral portion to said central portion.

3. A transducer according to claim 2, wherein said spokes extend radially from said central portion to said annular peripheral portion.

4. An electro-mechanical transducer comprising (a) pole pieces defining an air gap, (b) means for creating a magnetic field across said air gap, (c) a supporting member both sides of which are substantially freely accessible to the surrounding air, the supporting member including spokes, (d) a coil secured to said spokes intermediate the ends of the spokes and disposed within said air gap, (e) a button carried by said member for picking up mechanical vibrations of a body by physical contact with the body, (f) a magnet body of cylindrical form, (g) a plate closing one end of said magnet body, and (h) the other end of said magnet body being of castellated form and including surfaces defining a plurality of circumferentially spaced recesses, said supporting member being secured to said other end of said magnet body with said spokes overlying the recesses.

5. An electro-mechanical transducer as claimed in claim 4, and further comprising (i) a permanent magnet within said magnet body and constituting said means for creating said field across said air gap, (j) a washer of annular form having its inner peripheral edge seating on one of said pole pieces and its outer peripheral edge turned over, (k) said permanent magnet and said magnet body being spaced apart to provide a space between said permanent magnet and said magnet body, and (l) a ring disposed within said magnet body, the ring surrounding said permanent magnet and closing the space between said permanent magnet and said magnet body, there being a circular groove in said ring and the turned over edge of said washer being entered in the groove.

6. An electro-mechanical transducer comprising (a) pole pieces defining an air gap, (b) means for creating a magnetic field across said air gap, (c) a supporting member both sides of which are substantially freely accessible to the surrounding air, the supporting member including spokes, (d) a coil secured to said spokes intermediate the ends of the spokes and disposed within said air gap, (e) a button carried by said member for picking up mechanical vibrations of a body by physical contact with the body, (f) a magnet body of cylindrical form, (g) a plate closing one end of said magnet body and the other end of said magnet body being of castellated form and including surfaces defining a plurality of circumferentially spaced recesses, said supporting member being secured to said other end of said magnet body with said spokes overlying the recesses, (h) a casing of cylindrical form surrounding said magnet body, (i) a disc-like end to said casing, said supporting member being between said disc-like end and said other end of the magnet body, (j) parts of said casing defining a centrally disposed aperture in said disc-like end through which aperture said button projects, and (k) further parts of said casing defining holes in the cylindrical walling of the casing for placing said recesses in communication with the surrounding air.

7. An electromechanical transducer comprising (a) pole pieces defining an air gap, (b) means for creating a magnetic field across said air gap, (c) a supporting member both sides of which are substantially freely accessible to the surrounding air, the supporting member including a central portion, a peripheral portion fixed with respect to said pole pieces and spokes connecting said peripheral portion to said central portion, said spokes having the smallest area which is consistent with the central portion being sufficiently well supported, (d) a coil secured to said supporting member and disposed within said air gap, and (e) a button carried by said member for picking up mechanical vibrations of a body by physical contact therewith.

References Cited by the Examiner

UNITED STATES PATENTS

| 2,415,310 | 2/47 | Summerville et al. | 336—30 X |
| 2,623,938 | 12/52 | Thomas | 336—30 X |
| 2,864,155 | 12/58 | Willson | 317—201 X |

JOHN F. BURNS, *Primary Examiner.*